United States Patent [19]
Jäckel

[11] Patent Number: 5,135,092
[45] Date of Patent: Aug. 4, 1992

[54] APPARATUS FOR TRANSMITTING TORQUE

[75] Inventor: Johann Jäckel, Baden-Baden, Fed. Rep. of Germany

[73] Assignee: Luk Lamellen und Kupplungsbau GmbH, Bühl, Fed. Rep. of Germany

[21] Appl. No.: 724,430

[22] Filed: Jul. 3, 1991

[30] Foreign Application Priority Data

Jul. 7, 1990 [DE] Fed. Rep. of Germany ....... 4021668

[51] Int. Cl.⁵ .......................... F16D 3/14; F16D 3/66; F16D 3/80
[52] U.S. Cl. ................... 192/106.2; 74/574; 464/68; 192/106.1
[58] Field of Search ............... 192/106.2, 106.1, 70.17, 192/30 V; 74/574; 464/66, 68

[56] References Cited

U.S. PATENT DOCUMENTS

| | | | |
|---|---|---|---|
| 4,611,701 | 9/1986 | Friedmann | 192/110 B |
| 4,723,463 | 2/1988 | Reik | 74/574 |
| 4,732,250 | 3/1988 | Maucher | 192/70.17 |
| 4,788,884 | 12/1988 | Reik et al. | 74/574 |
| 4,816,006 | 3/1989 | Friedmann | 192/106.2 X |
| 4,856,636 | 8/1989 | Meinhard | 192/70.17 |
| 4,944,712 | 7/1990 | Wörner et al. | 464/68 X |
| 5,040,433 | 8/1991 | Reik et al. | 74/574 |
| 5,042,632 | 8/1991 | Jäckel | 192/106.2 |
| 5,059,156 | 10/1991 | Wörner et al. | 464/68 |

FOREIGN PATENT DOCUMENTS 3721705 1/1988 Fed. Rep. of Germany .
3721706 1/1988 Fed. Rep. of Germany ... 192/106.2

Primary Examiner—Richard Lorence
Attorney, Agent, or Firm—Peter K. Kontler

[57] ABSTRACT

Apparatus for transmitting torque in the power train of a motor vehicle has a first flywheel which is connected to the crankshaft of the engine and a second flywheel which is coaxial with and can rotate relative to the first flywheel and is connectable with the input shaft of the variable-speed transmission by a friction clutch. A composite damping device between the flywheels has an outer damper which is first to respond when the flywheels leave their starting angular positions relative to each other, and an inner damper which is in series with the outer damper and has an output element rigid with the second flywheel. The output element of the first damper is a coupling member having two discs which flank the output element of the second damper and one of which is centered by the peripheral surface of an annular part on the output element of the second damper. The outer damper has coil springs which are interposed between the first flywheel and the discs of the coupling member, and the inner damper has coil springs which are interposed between the discs and the output element.

24 Claims, 2 Drawing Sheets

APPARATUS FOR TRANSMITTING TORQUE

BACKGROUND OF THE INVENTION

The invention relates to improvements in apparatus for transmission of torque in general, and more particularly to improvements in apparatus for transmitting torque in the power trains of motor vehicles. Still more particularly, the invention relates to combined torque transmitting and torsional vibrations damping apparatus which can be put to use between the output component of an internal combustion engine and the input component of a variable-speed transmission in a motor vehicle.

It is already known to transmit torque from the crankshaft of an engine to the input shaft of a variable-speed transmission by resorting to an apparatus which comprises a split or composite flywheel, namely a flywheel having a first flywheel connectable with the crankshaft and a second flywheel which is rotatable relative to and is coaxial with the first flywheel and can be connected with the input shaft of the transmission in response to engagement of a friction clutch. Reference may be had, for example, to commonly owned U.S. Pat. Nos. 4,611,701 (Friedmann), 4,723,463 (Reik et al.) and 4,732,250 (Maucher et al.) and to published German patent application Ser. No. P 37 21 705. One or more dampers are provided to transmit torque between the first and second flywheels as well as to damp vibrations of one of the flywheels relative to the other flywheel. As a rule, or at least in many instances, the apparatus will employ at least two dampers which are normally connected in series and comprise energy storing elements (e.g., coil springs) acting in the circumferential direction of the flywheels. It is further known to provide one of the flywheels with a chamber which receives at least one of the plural dampers.

OBJECTS OF THE INVENTION

An object of the invention is to provide an apparatus which is simpler than, but just as reliable as, heretofore known torque transmitting apparatus.

Another object of the invention is to provide an apparatus wherein the friction between the parts which should be free to move relative to each other is eliminated or reduced to a minimum.

A further object of the invention is to provide an apparatus wherein the wear upon the parts is less pronounced than in conventional apparatus.

An additional object of the invention is to provide an apparatus wherein the transmission of torque between the flywheels is effected by novel and improved damper means.

Still another object of the invention is to provide relatively simple and inexpensive flywheels for use in the above outlined apparatus.

A further object of the invention is to provide a novel and improved power train which embodies the above outlined torque transmitting apparatus.

Another object of the invention is to provide a novel and improved motor vehicle which embodies the above outlined power train.

A further object of the invention is to provide a novel and improved method of centering certain component parts of an apparatus which serves to transmit torque between coaxial flywheels in the power train between the output shaft of the engine and the input shaft of the transmission in a motor vehicle.

An additional object of the invention is to provide a novel and improved combination of dampers for use in the above outlined apparatus.

A further object of the invention is to provide a novel and improved connection between the serially connected dampers in the above outlined apparatus.

Another object of the invention is to simplify the assembly of constituents of the above outlined torque transmitting apparatus.

SUMMARY OF THE INVENTION

One feature of the invention resides in the provision of a torque transmitting apparatus which comprises a first rotary flywheel connectable with an output component (such as the crankshaft) of an engine in a motor vehicle, a second flywheel which is coaxial with and is rotatable relative to the first flywheel and is connectable, preferably by a clutch, with an input component of a transmission in the motor vehicle, a bearing (particularly an antifriction bearing with one or more annuli of rolling elements) between the flywheels, and a damping device including first and second dampers which are operative to oppose rotation of the flywheels relative to each other. One of the flywheels has a substantially annular chamber and at least the first damper of the damping device is located in the chamber. The damping device further comprises a coupling member (e.g., a composite coupling member) which extends into the chamber and connects the first damper in series with the second damper. The coupling member is turnable relative to the first and second dampers and the other flywheel carries a centering surface for the coupling member. The first damper has first energy storing elements (e.g., in the form of arcuate coil springs) acting in the circumferential direction of the flywheels between the coupling member and one of the flywheels, and the second damper has second energy storing elements (e.g., in the form of arcuate coil springs) acting in the circumferential direction of the flywheels between the coupling member and the other of the flywheels.

One of the first and second dampers is disposed radially outwardly of the other of the first and second dampers, and the coupling member preferably comprises two interconnected discs which are spaced apart from each other in the axial direction of the first and second flywheels, at least radially inwardly of the one (outer) damper. The other damper preferably comprises a substantially flange-like output element which extends substantially radially of the flywheel and is disposed axially between the discs of the coupling member and rotates with the second flywheel. The discs are or can be cupped and preferably include first portions which are disposed radially outwardly of the output element and are located at a first axial distance (e.g., zero distance or close to zero distance) from each other, and second portions which flank the output element and are located at a greater second axial distance from each other. The first portions of such discs can abut each other at the energy storing elements of the outer damper. It is presently preferred to employ two discs which are mirror images of each other with reference to a plane extending between the discs and being normal to the common axis of the first and second flywheels.

The thickness of the flange-like output element of the other (inner) damper preferably matches or is slightly less than the distance of the second portions of the discs from each other.

The discs are provided with windows for the energy storing elements of the inner damper and can comprise substantially wing-like confining portions or lugs for the energy storing elements of the inner damper. Such confining portions or lugs are adjacent the windows. The confining portions can include first confining portions radially outwardly of the energy storing elements of the inner damper and second confining portions which are disposed radially inwardly of the energy storing elements of the inner damper. In addition to or in lieu of the just described confining portions, the discs can be provided with substantially wing-like confining portions (e.g., in the form of lugs which are bent out of the general planes of the discs) for the energy storing elements of the one or outer damper, and such confining portions include confining portions or lugs which are located radially inwardly of the energy storing elements of the outer damper.

One of the discs is located between the output element of the inner damper and the second flywheel, and the other disc is in engagement with and is centered by the centering surface which is carried by the second flywheel. The output element of the inner damper (such output element rotates with the second flywheel) has a first side facing the second flywheel and a second side facing away from the second flywheel. In accordance with a presently preferred embodiment, the output element carries a substantially annular part which is located at its second side, and the aforementioned centering surface is provided on such annular part to be engaged by and to center that disc which is more distant from the second flywheel. The centering surface can constitute a peripheral (radially outermost) surface of the annular part. One or more preferably rivet-shaped fasteners can be provided to connect the output element and the annular part to the second flywheel.

The damping device can further comprise a friction ring which is adjacent the annular part. The annular part and the friction ring respectively comprise circumferentially aligned first and second profiled portions (e.g., in the form of preferably flat teeth), and the first profiled portions preferably alternate with play with the second profiled portions so that the annular part and the friction ring have a certain freedom of angular movement relative to each other. The first profiled portions can extend substantially radially inwardly of the annular part (i.e., they can constitute internal teeth of the annular part), and the second profiled portions can extend substantially radially outwardly of the friction ring (i.e., they can constitute external teeth of the friction ring).

The first flywheel preferably includes a wall (e.g., a sheet metal wall) which confronts the engine when the apparatus is installed between the engine and the transmission and has a radially inner portion which is connectable to the output element of the engine by bolts or other suitable fasteners. The radially inner portion of the wall preferably includes a radially outer part which extends axially and away from the second flywheel. The bearing can be disposed between such part of the radially inner portion and the second flywheel.

The aforementioned friction ring can form part of a friction generating means of the damping device, and such friction generating means is axially between the bearing and the radially inner portion of the aforementioned wall of the first flywheel. The friction generating means can include the aforementioned friction ring which has a substantially conical friction surface (conforming to and abutting the radially inner portion of the wall.

The apparatus preferably further comprises means for at least substantially sealing the chamber from the atmosphere so that the chamber can receive and retain a supply of hydraulic fluid, particularly grease, oil or another viscous or highly viscous fluid, which at least partially fills the chamber and lubricates the energy storing elements of at least one of the dampers.

Another feature of the invention resides in the provision of a torque transmitting apparatus which comprises a first rotary flywheel connectable with an output component of an internal combustion engine in a motor vehicle, a second flywheel which is coaxial with and is rotatable relative to the first flywheel and is connectable by a clutch to an input component of a variable-speed transmission in the motor vehicle, and a damping device which is operative to oppose rotation of the flywheels relative to each other. The first flywheel includes a wall confronting the engine in properly installed condition of the torque transmitting apparatus and having a radially inner portion connectable with the output component of the engine. The radially inner portion includes a substantially cupped part which extends axially and away from the second flywheel. A bearing is interposed between the cupped part of the radially inner portion of the wall and the second flywheel. In addition, the apparatus can comprise friction generating means interposed between the bearing and the radially inner portion of the wall.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
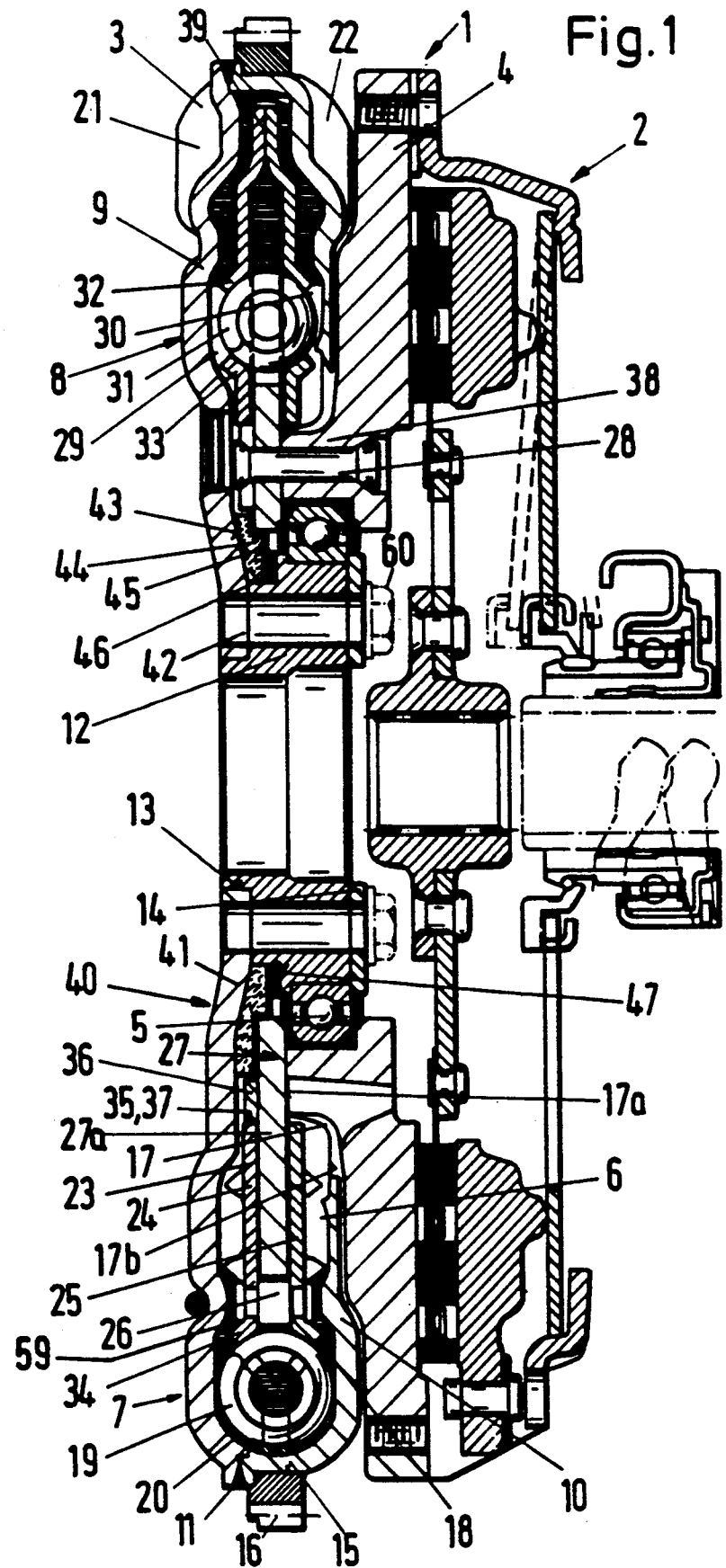
FIG. 1 is an axial sectional view of a torque transmitting apparatus which embodies one form of the invention, the operative position of a diaphragm spring forming part of a friction clutch between the second flywheel and the input component of the transmission being indicated by broken lines.

FIG. 1 shows a torque transmitting apparatus which can be used in the power train between the engine and the variable-speed transmission of a motor vehicle and comprises a composite flywheel 1 and a friction clutch 2. The composite flywheel 1 comprises a first flywheel 3 which is connectable to the output component (e.g., a crankshaft) of an internal combustion engine, and a second flywheel 4 which is coaxial with and is rotatable relative to the first flywheel 3 and can transmit torque to the input component of the transmission in response to engagement of the friction clutch 2. The latter can be of the type described in the aforementioned commonly owned U.S. Pat. Nos. 4,611,701, 4,723,463 and 4,732,250. These patents further show the engine, its output component, the transmission and its input component. The means for separably connecting the flywheel 3 to the output component of the engine can comprise a set of bolts or other suitable fasteners 60, preferably of the type described and shown in the recently filed commonly owned copending patent applications Ser. Nos. 07/708,935 of Friedmann and 07/708,934 of Reik et al., both filed May 31, 1991.

An antifriction bearing 5 is installed between the flywheels 3 and 4. The illustrated antifriction bearing 5 has a single annulus of spherical rolling elements; however, it is equally within the purview of the invention to employ two or more antifriction bearings and each antifriction bearing can comprise one, two or more annuli of spherical, barrel-shaped or otherwise configurated rolling elements.

The first flywheel 3 can be said to constitute a housing which defines an annular chamber 6 accommodating at least a portion of a novel and improved damper device including a first or outer damper 7 and a second or inner damper 8 in series with the damper 7. The purpose of the dampers 7, 8 is to transmit torque between the flywheels 3, 4 as well as to damp fluctuations of transmitted torque which can be transmitted from the engine to the transmission or in the opposite direction.

The first flywheel 3 comprises two substantially shell-shaped walls 9 and 10 which are or can be made of metallic sheet material and the radially outermost portions of which are adjacent and are connected to each other by a welded joint 11 which seals the radially outermost portion of the annular chamber 6 from the atmosphere. The chamber 6 is at least partially filled with a viscous fluid 59, such as oil or a grease, which serves to lubricate the energy storing elements 19 and 31 of the dampers 7 and 8, respectively. The minimum quantity of viscous fluid 59 is preferably selected in such a way that at least the radially outermost portions of the energy storing elements 31 of the inner damper 8 are contacted by the confined fluid while the fluid is caused to fill the radially outer portion 18 of the chamber 6 under the action of centrifugal force when the engine drives the flywheel 3.

The radially inner portion 41 of the wall 9 is integral with or is separably connected to a coaxial axially extending protuberance 12 which is surrounded by the inner race of the antifriction bearing 5. In the illustrated apparatus, the protuberance 12 is a separately produced part which is provided with an annular shoulder 13 serving to center the radially inner portion 41 of the wall 9. A washer 14 is provided to engage the inner race of the bearing 5 and to hold such inner race against axial movement in a direction away from the radially inner portion 41 of the wall 9.

The other wall 10 of the first flywheel 3 has a peripheral surface 15 which is surrounded by and centers a ring-shaped starter gear 16. The annular chamber 6 is disposed between the walls 9 and 10 of the first flywheel 3.

The means for at least substantially sealing the chamber 6 and the confined viscous fluid from the surrounding atmosphere further comprises a diaphragm- or membrane-type sealing element 17 which operates between the radially inner portion of the wall 10 and the flywheel 4. The wall 10 extends substantially radially and is axially interposed between the second flywheel 4 and the wall 9 of the first flywheel 3.

The aforementioned portion 18 of the annular chamber 6 is disposed between the radially outer portions of the walls 9, 10 and is subdivided into two or more arcuate sections or compartments, one for each of the energy storing elements 19 forming part of the outer damper 7. The outer portion 18 of the chamber 6 further receives an arcuate trough-shaped shroud or shield 20 which is engaged by the adjacent radially outermost portions of convolutions of the coil spring-shaped energy storing elements 19 when the flywheel 3 is driven, i.e., when the elements 19 are acted upon by centrifugal force. This eliminates the possibility of any, or any pronounced, wear upon the internal surfaces of the walls 9 and 10 because such internal surfaces cannot be directly contacted by the convolutions of the energy storing elements 19.

The external surfaces of the radially outer portions of the walls 9, 10 are provided with depressions 21 and 22, respectively, which establish internal partitions extending between the end convolutions of neighboring energy storing elements 19. The end convolutions of the energy storing elements 19 are also engaged by the radially outwardly extending motion transmitting portions or arms 39 forming part of two discs 24, 25. These discs together constitute a composite coupling member 23 which is the output element of the outer damper 7. The input element of this damper is the flywheel 3, i.e., the energy storing elements 19 operate in the circumferential direction of the flywheels between the flywheel 3 and the discs 24, 25 of the coupling member 23. The latter further constitutes the input element of the inner damper 8, the output element of which is a substantially radially extending flange-like member 27 which is non-rotatably connected to the second flywheel 4 by rivets 28 or other suitable fasteners. The energy storing elements 31 of the inner damper 8 operate between the coupling member 23 and the output element 27, i.e., between the coupling member 23 and the second flywheel 4.

The elements 19 are caused to store energy when the aforementioned partitions (inwardly of the depressions 21, 22 in the walls 9, 10) are caused to turn relative to the radially outwardly extending portions or arms 39 of the discs 24, 25 or vice versa, and the elements 31 of the inner damper 8 are caused to store energy when the coupling member 23 is caused to turn relative to the second flywheel 4 and/or vice versa.

The means for non-rotatably connecting the discs 24, 25 of the substantially radially extending coupling member 23 to each other comprises rivets 26 and/or other suitable fasteners. The rivets 26 are located radially inwardly of and are adjacent the nearest energy storing elements 19 of the outer damper 7. The illustrated discs 24, 25 are cupped and their radially inner portions flank the output element 27 of the inner damper 8 with minimal clearance, i.e., the distance between such radially inner portions of the discs 24, 25 only slightly exceeds the thickness of the output element 27. The radially outer portions 39 of the discs 24 constitute the aforementioned motion transmitting arms which extend between the adjacent partitions of the walls 9 and 10 in the neutral position of the damper 7. Reference may be had to the aforementioned recently filed copending patent applications Ser. Nos. 07/708,935 and 07/708,934. As can be seen in the lower part of FIG. 1, the radially outer portions 39 of the discs 24, 25 abut each other at least in the radially outer regions of end convolutions of neighboring energy storing elements 19 of the outer damper 7.

The radially inner portions of the discs 24, 25 are held in preselected axial positions by the output element 27 which is riveted to the second flywheel 4 but each of these discs is turnable relative each of the flywheels 3 and 4. This enables the coupling member 23 to connect the dampers 7 and 8 in series. The axial positions of the discs 24, 25 in the apparatus of FIG. 1 are selected in such a way that these discs cannot contact the walls 9 and 10, respectively, of the first flywheel 3. This reduces the likelihood of unnecessary and uncontrolled friction and reduces the likelihood of premature wear upon the discs 24, 25 and upon the walls 9, 10.

The discs 24, 25 are provided with windows 29, 30 for portions of the energy storing elements 31 of the damper 8. In addition, the discs 24, 25 are provided with substantially wing-shaped centering or confining projections or portions or lugs 32, 33 which are closely adjacent the respective windows 29 and 30. Such lugs guide the corresponding energy storing elements 31 of the inner damper 8. The lugs 32 are disposed radially outwardly and the lugs 33 are disposed radially inwardly of the respective energy storing elements 31. The lugs 32, 33 partially overlie the adjacent energy storing elements 31 and ensure optimal guidance of the adjacent elements 31 in the radial and axial directions, particularly to prevent any frictional contact between the elements 31 on the one hand and the walls 9, 10 of the first flywheel 3 on the other hand.

Additional substantially wing-shaped confining portions or lugs 34 are provided on the discs 24, 25 for the energy storing elements 19 of the outer damper 7. The lugs 34 which are shown in FIG. 1 are located radially inwardly of the respective elements 19 so that each of these elements is confined between the shroud 20 and at least two lugs 34. The rivet 26 which is shown in the lower portion of FIG. 1 is closely adjacent and is located radially inwardly of the lugs 34. The shanks of the rivets 26 are designed to maintain the adjacent portions of the discs 24, 25 at an optimum distance from each other; as mentioned above, such distance need only slightly exceed the thickness of the output element 27.

In accordance with a feature of the invention, the coupling member 23 including the discs 24, 25 is centered by a ring-shaped centering surface 35 which is carried by the second flywheel 4. The centering surface 35 is the peripheral surface of an annular part 36 adjacent that side of the output element 27 which faces away from the second flywheel 4. This annular part 36 is surrounded by the complementary cylindrical internal surface 37 of that disc (24) which is more distant from the second flywheel 4, i.e., the output element 27 and the disc 25 are located between the flywheel 4 and the centered disc 24. This automatically centers the disc 25 since the latter is rigidly connected to the disc 24 by the rivets 26. The rivets 28 can be designed and mounted in such a way that they serve to connect the second flywheel 4 with the output element 27 as well as with the annular part 36 which is provided with the centering surface 35 for the internal surface 37 of the disc 24. The annular part 36 and the disc 24 are located between the output element 27 and the wall 9 of the first flywheel 3.

The rivets 28 are installed in an axial protuberance 38 of the flywheel 4; this protuberance surrounds the outer race of the bearing 5. A thermal barrier is installed between the bearing 5 on the one hand and the protuberance 38 and the output element 27 one the other hand to prevent the transfer of excessive amounts of heat from the flywheel 4 to the contents of the chamber 6 when the friction clutch 2 is being engaged or disengaged so that the flywheel 4 can turn relative to the adjacent friction lining of the clutch plate in the clutch 2. Such clutch plate is non-rotatably mounted on the input component of the transmission.

The aforementioned diaphragm- or membrane-like sealing element 17 for the radially inner portion of the chamber 6 has a radially outer portion 17b which is in sealing engagement with a shoulder of the radially inner portion of the wall 10, and a radially inner portion 17a which is sealingly clamped between the adjacent side of the output element 27 and the protuberance 38 of the flywheel 4.

The feature that the peripheral surface 35 of the annular part 36 directly centers only one (24) of the discs 24, 25 contributes to a pronounced reduction of friction between the coupling member 23 and the parts which rotate with the flywheel 4.

As already mentioned above, the abutting radially outer portions 39 of the discs 24, 25 constitute motion transmitting arms which extend between the end convolutions of neighboring energy storing elements 19 and cooperate with the partitions (inwardly of the depressions 21, 22) to cause the elements 19 to store energy when the flywheel 3 is caused to turn relative to the coupling member 23 and/or vice versa. The end portions 39 are located between (i.e., they are flanked by) the respective depressions 21, 22 and the corresponding partitions when the flywheels 3, 4 are caused or permitted to assume their neutral positions.

The damping device which includes the series-connected dampers 7, 8 further comprises a friction generating device 40 which surrounds the axial protuberance 12 of the flywheel 3 and is located between the radially inner portion 41 of the wall 9 and the bearing 5. This friction generating device is installed in the radially innermost portion of the chamber 6. The radially inner portion 41 of the wall 9 has bores or holes 42 which register with bores in the protuberance 12 and serve to receive the shanks of the bolts 60 (indicated by phantom lines) which serve to separably secure the portion 41 to the output component of the engine. The portion 41 is cupped immediately radially outwardly of the bores or holes 42 (i.e., it extends axially away from the flywheel 4) to provide more room for the friction generating device 40. The cupped part of the radially inner portion 41 of the wall 9 extends at least along an at least substantially complementary conical surface 43 of a friction ring 44 which is surrounded by the annular part 36 at the left-hand side of the output element 27.

The friction generating device 40 further comprises a washer 45 which abuts the right-hand side of the friction ring 44 and is biased against the latter by a diaphragm spring 46 reacting against a shoulder 47 of the protuberance 12 adjacent the inner race of the bearing 5.

The conical surface 43 which abuts the cupped or dished part of radially inner portion 41 of the wall 9 imparts to the friction ring 44 a substantially wedge-shaped cross-sectional outline.

The friction generating device 40 is rendered operative by the annular part 36 which carries the centering surface 35 for the internal surface 37 of the disc 24. To this end, the annular part 36 is provided with radially inwardly extending projections or profiled portions 50

Figure 2:
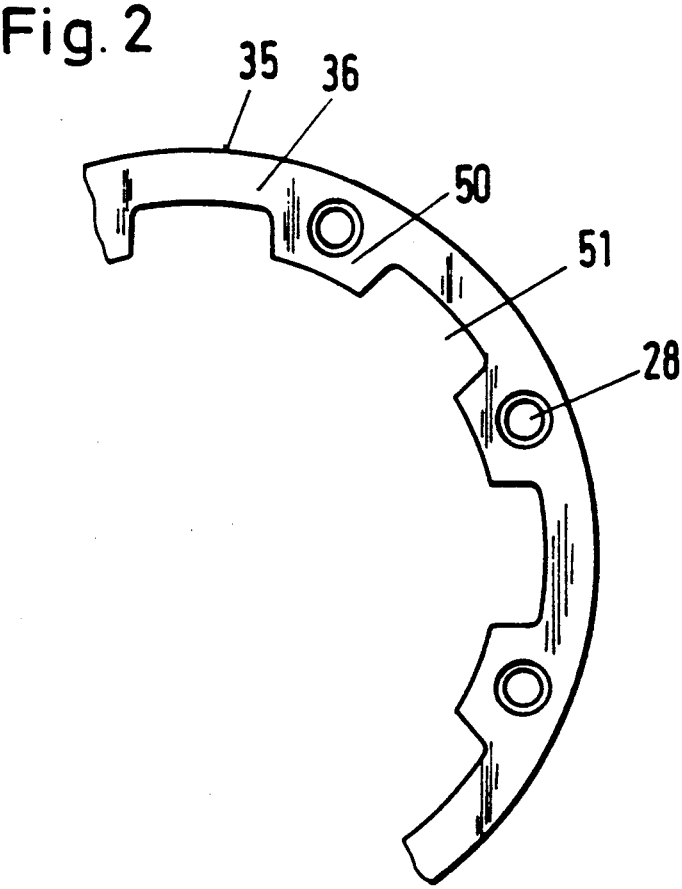
FIG. 2 is a fragmentary elevational view of an annular part which is provided with the centering surface and rotates with the second flywheel.
Figure 3:
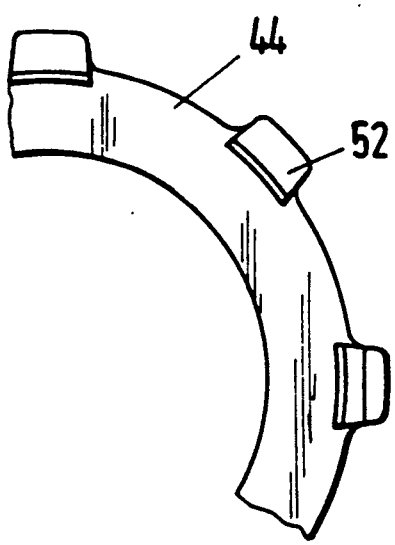
FIG. 3 is a fragmentary elevational view of a friction ring of a friction generating device in the apparatus of FIG. 1.

(FIG. 2) in the form of flat teeth which define relatively wide recesses or tooth spaces 51 for the radially outwardly extending profiled projections or teeth 52 (FIG. 3) of the friction ring 44. The teeth 52 are received in the respective tooth spaces 51 with a preselected amount of play in the circumferential direction of the flywheels 3, 4 so that the teeth 50 engage and entrain the adjacent teeth 52 in response to a predetermined angular displacement of the flywheels 3, 4 relative to each other before the conical surface 43 of the friction ring 44 begins to slip along the adjacent complementary surface of radially inner portion 41 of the wall 9 and/or vice versa. The teeth 50 and 52 are aligned with each other in the circumferential direction of the flywheels 3 and 4, i.e., such teeth are located, at least in part, in a common plane extending at right angles to the common axis of the flywheels. The feature that the teeth 50 and 52 of the annular part 36 and friction ring 44 have a certain freedom of angular movement relative to each other before they activate the friction generating device 40 ensures the establishment or development of socalled delayed friction or friction hysteresis. Thus, if the direction of rotation of the flywheels 3, 4 relative to each other is reversed, the friction generating device 40 remains ineffective as long as is necessary to move the teeth 50 into engagement with the adjacent teeth 52, i.e., the friction generating device 40 remains ineffective for an interval of time which is necessary to move the teeth 50 through a distance corresponding to the width of a clearance or tooth space 51 minus the width of a tooth 52 (all as measured in the circumferential direction of the flywheels 3 and 4).

The energy storing elements 31 of the inner damper 8 can be stressed by the radially outer portions or arms 27a of the output element 27 and by the surfaces bounding the respective windows 29, 30 of the discs 24, 25.

An important advantage of the improved apparatus is that the fluctuations of torque which is transmitted between the flywheels 3 and 4 can be damped with particular advantage in a composite flywheel 1 which is composed of or includes two coaxial flywheels and wherein the damping action of the outer damper 7 is much less pronounced than that of the inner damper 8. Due to the aforedescribed design of the apparatus, the operation of the outer damper 7 is not affected (or is affected only negligibly) by any uncontrollable friction, especially during the initial stage of stressing of the arcuate energy storing elements 19 when the damping device is called upon to transmit a relatively small torque. In many instances, the resistance of the outer damper 7 to rotation of the flywheels 3, 4 relative to each other will be selected in such a way that it amounts to between 1 and 8 Nm/°. On the other hand, the resistance of the inner damper 8 to rotation of the flywheels 3, 4 relative to each other can be in the range of between 15 and 50 Nm/°, depending on the selected utilization of the improved apparatus. It has been found that the operation of the improved apparatus is particularly satisfactory when the engine is idling.

The feature that the radially inner portions of the discs 24, 25 are axially spaced apart from each other exhibits the advantage that such radially inner portions can properly guide and confine at least the arcuate energy storing elements 31 of the inner damper 8 so that the elements 31 are kept out of contact with the walls 9 and 10 of the flywheel 3. The provision of lugs 32, 33 also contributes to retention of the energy storing elements 31 out of contact with the walls 9, 10 of the first flywheel 3.

The discs 24, 25 of the illustrated coupling member 23 are mirror images of each other in order to reduce the cost of the improved apparatus. However, it is equally within the purview of the invention to assemble the coupling member 23 of two discs which are not of identical size and/or shape.

The difference between the thickness of the output element 27 and the distance of radially inner portions of the discs 24, 25 from each other can be very small, e.g., in the range of 0.2 to 1.5 mm. This brings about the aforediscussed advantage that the output element 27 (which is affixed to the flywheel 4) can maintain the discs 24, 25 in optimum axial positions in which the discs cannot rub against the walls 9, 10 of the flywheel 3. This also ensures that no friction develops to oppose rotation of the flywheels 3, 4 relative to each other, at least during the initial stage of rotation of these flywheels in directions to effect compression of arcuate coil springs 19 which constitute the energy storing elements of the outer damper 7 which is first to oppose rotation of the flywheels 3, 4 from their neutral positions. When speaking of uncontrollable friction, reference is made to friction which develops between the energy storing elements of the first damper and the adjacent flywheel in a conventional torque transmitting and damping apparatus.

The lugs 32, 33 and 34 can extend circumferentially of the flywheels 3, 4 to ensure adequate guidance and confinement of sufficiently large portions of the adjacent energy storing elements 31 and 19.

The aforediscussed configuration of the wall 9 (and more particularly of the radially inner portion 41 of this wall) in the region of the friction generating device 40 constitutes an additional important novel feature of the improved apparatus. The axially extending part of the radially inner portion 41 which diverges in a direction away from the flywheel 4 and output element 27 renders it possible to provide adequate room for a satisfactory friction generating device 40 which becomes effective with a delay in response to each reversal of the direction of rotation of the flywheels 3, 4 relative to each other. This is attributable to the aforediscussed dimensioning of tooth spaces 51 which receive the teeth 52 of the friction ring 44 with a certain amount of clearance in the circumferential direction of the flywheels 3 and 4.

The conicity of the friction surface 43 of the friction ring 44 is desirable and advantageous because it establishes a larger-area contact with the wall 9 and also because the radially inner portion 41 of the wall 9 can automatically center the ring 44.

The supply of viscous fluid 59 not only ensures adequate lubrication of the energy storing elements 19 and 31 but exhibits the additional advantage that it contributes to a reduction of wear upon the parts of the damping device and reduces friction where the friction is undesirable because it could affect predictable operation of the damper 7 and/or 8.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Torque transmitting apparatus comprising a first rotary flywheel connectable with an output component of an engine in a motor vehicle; a second flywheel coaxial with and rotatable relative to said first flywheel and connectable by a clutch with an input component of a transmission in the vehicle; a bearing between said flywheels; and a damping device including first and second dampers operative to oppose rotation of said flywheels relative to each other, one of said flywheels having a chamber and at least the first damper of said damping device being located in said chamber, said damping device further comprising a coupling member which extends into said chamber and connects said first damper in series with said second damper, said coupling member being turnable relative to said first and second dampers and the other of said flywheels carrying a centering surface for said coupling member, said first damper having first energy storing elements acting in the circumferential direction of said flywheels between said coupling member and one of said flywheels and said second damper having second energy storing elements acting in the circumferential direction of said flywheels between said coupling member and the other of said flywheels.

2. The apparatus of claim 1, wherein one of said first and second dampers is disposed radially outwardly of the other of said first and second dampers, said coupling member comprising two interconnected discs which are spaced apart from each other in the axial direction of said flywheels at least radially inwardly of said one damper.

3. The apparatus of claim 2, wherein said other damper comprises a substantially flange-like output element which extends substantially radially of said flywheels and is disposed axially between said discs and rotates with said second flywheel.

4. The apparatus of claim 3, wherein said discs are cupped and include first portions disposed radially outwardly of said output element and being located at a first axial distance from each other and second portions flanking said output element and being located at a greater second axial distance from each other.

5. The apparatus of claim 2, wherein said discs have abutting portions at the energy storing elements of said one damper.

6. The apparatus of claim 2, wherein said discs are mirror images of each other.

7. The apparatus of claim 2, wherein said other damper comprises a substantially flange-like output element having a predetermined thickness and extending substantially radially of said flywheels, said output element being disposed between said discs and being connected with said second flywheel, said discs having portions which flank said output element and are spaced apart from one another a distance only slightly exceeding said predetermined thickness.

8. The apparatus of claim 2, wherein said discs have windows for the energy storing elements of said other damper and substantially wing-like confining portions for the energy storing elements of said other damper, said confining portions being adjacent said windows.

9. The apparatus of claim 8, wherein said confining portions include first confining portions radially outwardly and second confining portions radially inwardly of the energy storing elements of said other damper.

10. The apparatus of claim 2, wherein said discs comprise substantially wing-like confining portions for the energy storing elements of said one damper, said confining portions including confining portions located radially inwardly of the energy storing elements of said on damper.

11. The apparatus of claim 2, wherein said other damper comprises a substantially flange-like output element which is disposed between said discs and rotates with said second flywheel, one of said discs being located between said output element and said second flywheel and the other of said discs being in engagement with and being centered by said centering surface.

12. The apparatus of claim 2, wherein said other damper comprises a substantially flange-like output element which is disposed between said discs and rotates with said second flywheel, said output element having a first side facing said second flywheel and a second side facing away from said second flywheel, said output element comprising or carrying a substantially annular part disposed at said second side thereof and provided with said centering surface.

13. The apparatus of claim 12, wherein said annular part has a peripheral surface which includes said centering surface.

14. The apparatus of claim 12, further comprising at least one substantially rivet-shaped fastener connecting said output element and said annular part to said second flywheel.

15. The apparatus of claim 12, wherein said damping device further comprises a friction ring adjacent said annular part, said annular part and said friction ring respectively having circumferentially aligned first and second profiled portions, said first profiled portions alternating with play with said second profiled portions.

16. The apparatus of claim 15, wherein said first profiled portions extend substantially radially inwardly of said annular part and said second profiled portions extend substantially radially outwardly of said friction ring.

17. The apparatus of claim 1, wherein said first flywheel includes a wall confronting the engine and having a radially inner portion connectable with the output element of the engine, said radially inner portion having a part extending axially and away from said second flywheel.

18. The apparatus of claim 17, wherein said bearing is disposed between said radially inner portion of said wall and said second flywheel.

19. The apparatus of claim 18, wherein said damping device further comprises friction generating means disposed axially between said bearing and said radially inner portion of said wall.

20. The apparatus of claim 19, wherein said friction generating means includes a friction ring having a substantially conical friction surface conforming to and abutting said radially inner portion of said wall.

21. The apparatus of claim 1, further comprising means for at least substantially sealing said chamber from the atmosphere and further comprising a supply of viscous fluid at least partially filling said chamber.

22. The apparatus of claim 1, wherein said first flywheel includes a wall confronting the engine and having a radially inner portion connectable with the output component of the engine and including a substantially cupped part extending axially of and away from said second flywheel.

23. The apparatus of claim 22, wherein said bearing is interposed between said radially inner portion of said wall and said second flywheel.

24. The apparatus of claim 23, further comprising friction generating means interposed between said bearing and said radially inner portion of said wall.

* * * * *